United States Patent
Maurer et al.

(10) Patent No.: US 10,634,403 B2
(45) Date of Patent: Apr. 28, 2020

(54) EVAPORATOR HAVING A FLUID DISTRIBUTION SUB-ASSEMBLY

(71) Applicant: LOCKHEED MARTIN CORPORATION, Bethesda, MD (US)

(72) Inventors: Scott M. Maurer, Haymarket, VA (US); Derek M. Beckner, Manassas Park, VA (US); Nicholas J. Nagurny, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 320 days.

(21) Appl. No.: 15/178,220

(22) Filed: Jun. 9, 2016

(65) Prior Publication Data

US 2016/0363355 A1    Dec. 15, 2016

Related U.S. Application Data

(60) Provisional application No. 62/173,658, filed on Jun. 10, 2015.

(51) Int. Cl.
*F25B 39/02*    (2006.01)
*F25B 39/00*    (2006.01)
(Continued)

(52) U.S. Cl.
CPC .............. *F25B 39/00* (2013.01); *F25B 39/02* (2013.01); *F28D 3/04* (2013.01); *F28D 5/02* (2013.01);
(Continued)

(58) Field of Classification Search
CPC ........ F28D 3/02; F28D 3/04; F25B 2339/024; F25B 2339/021; F25B 39/02;
(Continued)

(56) References Cited

U.S. PATENT DOCUMENTS 6,167,713 B1    1/2001  Hartfield et al.
6,516,627 B2 *  2/2003  Ring ..................... F25B 31/004
                                                              62/193
(Continued)

FOREIGN PATENT DOCUMENTS

EP    0661504 A1    7/1995

OTHER PUBLICATIONS

International Preliminary Report on Patentability for International Patent Application No. PCT/US2016/036900, dated Dec. 21, 2017, 12 pages.

(Continued)

*Primary Examiner* — Henry T Crenshaw
*Assistant Examiner* — Kamran Tavakoldavani
(74) *Attorney, Agent, or Firm* — Withrow & Terranova, PLLC

(57) ABSTRACT

An evaporator comprises a plurality of thermal elements disposed in a shell interior of an evaporator shell. A primary supply line configured to carry a working fluid is disposed in the shell interior. A plurality of tube sets is fluidically coupled to the primary supply line, and each tube set is spaced apart from an adjacent tube set along the first primary supply line. Each tube set comprises a plurality of individual tubes, with each tube proximate a different subset of thermal elements within the shell interior. Each tube comprises a plurality of first fluid distribution points configured to distribute the working fluid proximate the external surface of at least one of the plurality of thermal elements, thereby increasing the amount of surface area of the thermal elements in contact with the working fluid, and increasing the overall efficiency of the evaporator.

21 Claims, 10 Drawing Sheets

(51) Int. Cl.
*F28D 3/04* (2006.01)
*F28D 7/16* (2006.01)
*F28D 5/02* (2006.01)

(52) U.S. Cl.
CPC .............. *F28D 7/16* (2013.01); *F25B 39/028* (2013.01); *F25B 2339/0242* (2013.01); *Y02E 10/34* (2013.01)

(58) Field of Classification Search
CPC . F25B 39/028; F25B 39/00; F28F 9/14; F28F 9/18; F28F 9/185; F28F 165/159; F28F 165/16; F28F 165/162; F28F 165/905; Y02E 10/34
USPC .................................. 165/159, 160, 162, 905
See application file for complete search history.

(56) References Cited

U.S. PATENT DOCUMENTS

| | | | | |
|---|---|---|---|---|
| 6,916,453 | B2* | 7/2005 | Filippi | B01J 8/0214 422/198 |
| 8,302,426 | B2* | 11/2012 | de Larminat | F25B 39/028 62/515 |
| 8,439,250 | B2 | 5/2013 | Takeshita et al. | |
| 2006/0117782 | A1 | 6/2006 | Rini et al. | |
| 2008/0149311 | A1 | 6/2008 | Liu et al. | |
| 2009/0178790 | A1* | 7/2009 | Schreiber | F25B 39/028 165/158 |
| 2010/0139272 | A1 | 6/2010 | Howard et al. | |
| 2010/0326108 | A1 | 12/2010 | Schreiber et al. | |
| 2011/0120672 | A1 | 5/2011 | Ringwaldt | |
| 2012/0199330 | A1* | 8/2012 | Maurer | F25B 39/028 165/168 |
| 2014/0131010 | A1* | 5/2014 | Lee | F23L 15/045 165/104.15 |
| 2014/0311721 | A1 | 10/2014 | Esformes et al. | |
| 2015/0260464 | A1* | 9/2015 | Cole | F03G 7/05 165/185 |
| 2015/0345843 | A1* | 12/2015 | Voorhis | F28F 9/0273 62/504 |

OTHER PUBLICATIONS

Author Unknown, "Heat Transfer to Refrigerants Boiling on Tubes Covered with Porous Coatings," Heat Transfer: Soviet Research, vol. 13, Issue 1, Jan. 1981, Scripta Publishing Co., pp. 61-74.
International Search Report and Written Opinion for International Patent Application No. PCT/US2016/036900, dated Aug. 24, 2016, 16 pages.
Extended European Search Report for European Patent Application No. 16808377.2, dated Jan. 25, 2019, 7 pages.
First Office Action for Chinese Patent Application No. 201680032217.8, dated Sep. 25, 2019, 8 pages.

* cited by examiner

EVAPORATOR HAVING A FLUID DISTRIBUTION SUB-ASSEMBLY

RELATED APPLICATION

This application claims the benefit of provisional patent application Ser. No. 62/173,658 filed on Jun. 10, 2015, entitled "FLUID DISTRIBUTION SYSTEM AND FALLING FILM EVAPORATOR," the disclosure of which is hereby incorporated by reference in its entirety herein.

TECHNICAL FIELD

The embodiments relate to evaporators and, in particular, to an evaporator having a fluid distribution sub-assembly.

BACKGROUND

Evaporators may be used in many different applications, including, for example, a heat exchanger. In a heat exchanger application, a working fluid may be introduced into an evaporator shell in thermal communication with one or more thermal elements, which causes the working fluid to evaporate. In flooded-type and kettle-type evaporators, the thermal elements are completely or partially immersed in the working fluid. This arrangement is relatively inefficient, because the thermal elements must transfer heat to a relatively large volume of working fluid. Falling film-type evaporators, on the other hand, distribute the working fluid above the thermal elements and allow the working fluid to cascade over the thermal elements without inundating the thermal elements. As a result, falling film-type evaporators may be more efficient than flooded-type and kettle-type evaporators in small scale applications, because it is relatively easy to keep the entire surface areas of the thermal elements wetted with the working fluid. In larger scale applications, however, the heating elements must be larger and/or more numerous, which makes it more difficult to keep the surface areas of all the thermal elements wetted with the working fluid using conventional falling film arrangements. Instead, many portions the thermal elements in these larger scale applications tend to dry out, making the evaporator less efficient.

One example of a larger scale heat exchanger may be utilized in an Ocean Thermal Energy Conversion (OTEC) application. In a conventional OTEC application, an evaporator may have a shell and tube design layout in which a working fluid having a low boiling point, such as ammonia for example, is introduced. Tubes passing through the interior of the evaporator carry relatively warm surface-level sea water, causing the ammonia in contact with the tubes to boil off and power a turbogenerator inline with the evaporator. However, a large-scale conventional falling film evaporator for an OTEC application may have a diameter in excess of three meters, which can result in many of the tubes near the bottom of the evaporator drying out. Thus, there is a need in the art for a large-scale falling-film type evaporator having improved efficiency.

SUMMARY

In one embodiment, an evaporator is disclosed. The evaporator comprises a plurality of thermal elements, such as tubes carrying warm seawater for example, disposed in a shell interior of an evaporator shell. A primary supply line, configured to carry a working fluid, such as ammonia for example, is disposed in the shell interior. A plurality of tube sets is fluidically coupled to the primary supply line, and each tube set is spaced apart from an adjacent tube set along the primary supply line. Each tube set comprises a plurality of individual tubes, with each tube proximate a different subset of thermal elements within the shell interior. Each tube comprises a plurality of first fluid distribution points configured to distribute the working fluid proximate the external surface of at least one of the plurality of thermal elements. One advantage of this arrangement is that fluid distribution points may be distributed in three dimensions throughout the evaporator shell, thereby wetting a greater proportion of the total external surface area of the thermal elements. As a result, a greater proportion of thermal energy from the thermal elements is transferred to the working fluid within the evaporator, and overall efficiency of the evaporator is increased.

In one embodiment, an evaporator is disclosed. The evaporator comprises an evaporator shell forming a shell interior. The evaporator further comprises a plurality of thermal elements disposed in the shell interior, each thermal element comprising an external surface in fluidic communication with the shell interior. The evaporator further comprises a first primary supply line disposed in the interior, the first primary supply line configured to carry a working fluid. The evaporator further comprises a plurality of first tube sets fluidically coupled to the first primary supply line, each first tube set spaced apart from an adjacent first tube set along the first primary supply line. Each first tube set comprises a plurality of first tubes, each first tube proximate a different subset of thermal elements of the plurality of thermal elements. Each first tube comprises a plurality of first fluid distribution points, each first fluid distribution point configured to distribute the working fluid proximate the external surface of at least one of the plurality of thermal elements.

In another embodiment, a fluid distribution assembly is disclosed. The fluid distribution assembly comprises a first primary supply line configured to carry a working fluid. The fluid distribution assembly further comprises a plurality of first tube sets fluidically coupled to the first primary supply line, the plurality of first tube sets configured to be disposed among a plurality of thermal elements. Each first tube set is spaced a first distance from an adjacent first tube set along the first primary supply line. Each first tube set comprises a plurality of first tubes, each first tube configured to be disposed proximate a different subset of thermal elements of the plurality of thermal elements. Each first tube comprises a plurality of first fluid distribution points, each first fluid distribution point configured to distribute the working fluid proximate the external surface of at least one of the plurality of thermal elements.

In another embodiment, a heat exchanger system is disclosed. The heat exchanger system comprises an evaporator. The evaporator comprises an evaporator shell forming a shell interior. The evaporator further comprises a plurality of thermal elements disposed in the shell interior, each thermal element comprising an external surface in fluidic communication with the shell interior. The evaporator further comprises a first primary supply line disposed in the interior, the first primary supply line configured to carry a working fluid. The evaporator further comprises a plurality of first tube sets fluidically coupled to the first primary supply line, each first tube set spaced apart from an adjacent first tube set along the first primary supply line. Each first tube set comprises a plurality of first tubes, each first tube proximate a different subset of thermal elements of the plurality of thermal elements. Each first tube comprises a plurality of first fluid distribution points, each first fluid distribution point configured to distribute the working fluid proximate the external surface of at least one of the plurality of thermal elements, the thermal elements configured to vaporize the working fluid. The heat exchanger system further comprises a turbogenerator comprising a working fluid inlet and a working fluid outlet and a turbine, the working fluid inlet fluidically coupled to the shell interior and configured to receive the vaporized working fluid, the turbine fluidically coupled between the working fluid inlet and the working fluid outlet and configured to generate electrical energy in response to the vaporized working fluid passing through the turbine. The heat exchanger system further comprises a condenser fluidically coupled between the working fluid outlet and the first primary supply line, the condenser configured to condense the working fluid and supply the condensed working fluid to the first primary supply line.

In another embodiment, a method of assembling an evaporator is disclosed. The method comprises disposing a plurality of thermal elements in an evaporator frame. The method further comprises disposing a plurality of fluid distribution tubes of a fluid distribution sub-assembly among the thermal elements, each first tube proximate a different subset of thermal elements of the plurality of thermal elements. The method further comprises enclosing the evaporator frame and the fluid distribution sub-assembly in an evaporator shell.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first tube set" and "second tube set," and does not imply a priority, a type, an importance, or other attribute, unless otherwise stated herein. The term "about" used herein in conjunction with a numeric value means any value that is within a range of ten percent greater than or ten percent less than the numeric value.

In one embodiment, an evaporator is disclosed. The evaporator comprises a plurality of thermal elements, such as tubes carrying warm seawater for example, disposed in a shell interior of an evaporator shell. A primary supply line, configured to carry a working fluid, such as ammonia for example, is disposed in the shell interior. A plurality of tube sets is fluidically coupled to the primary supply line, and each tube set is spaced apart from an adjacent tube set along the first primary supply line. Each tube set comprises a plurality of individual tubes, with each tube proximate a different subset of thermal elements within the shell interior. Each tube comprises a plurality of first fluid distribution points configured to distribute the working fluid proximate the external surface of at least one of the plurality of thermal elements. One advantage of this arrangement is that fluid distribution points may be distributed in three dimensions throughout the evaporator shell, thereby wetting a greater proportion of the total surface area of the thermal elements. As a result, a greater proportion of thermal energy from the thermal elements is transferred to the working fluid within the evaporator, and overall efficiency of the evaporator is increased.

Figure 1:
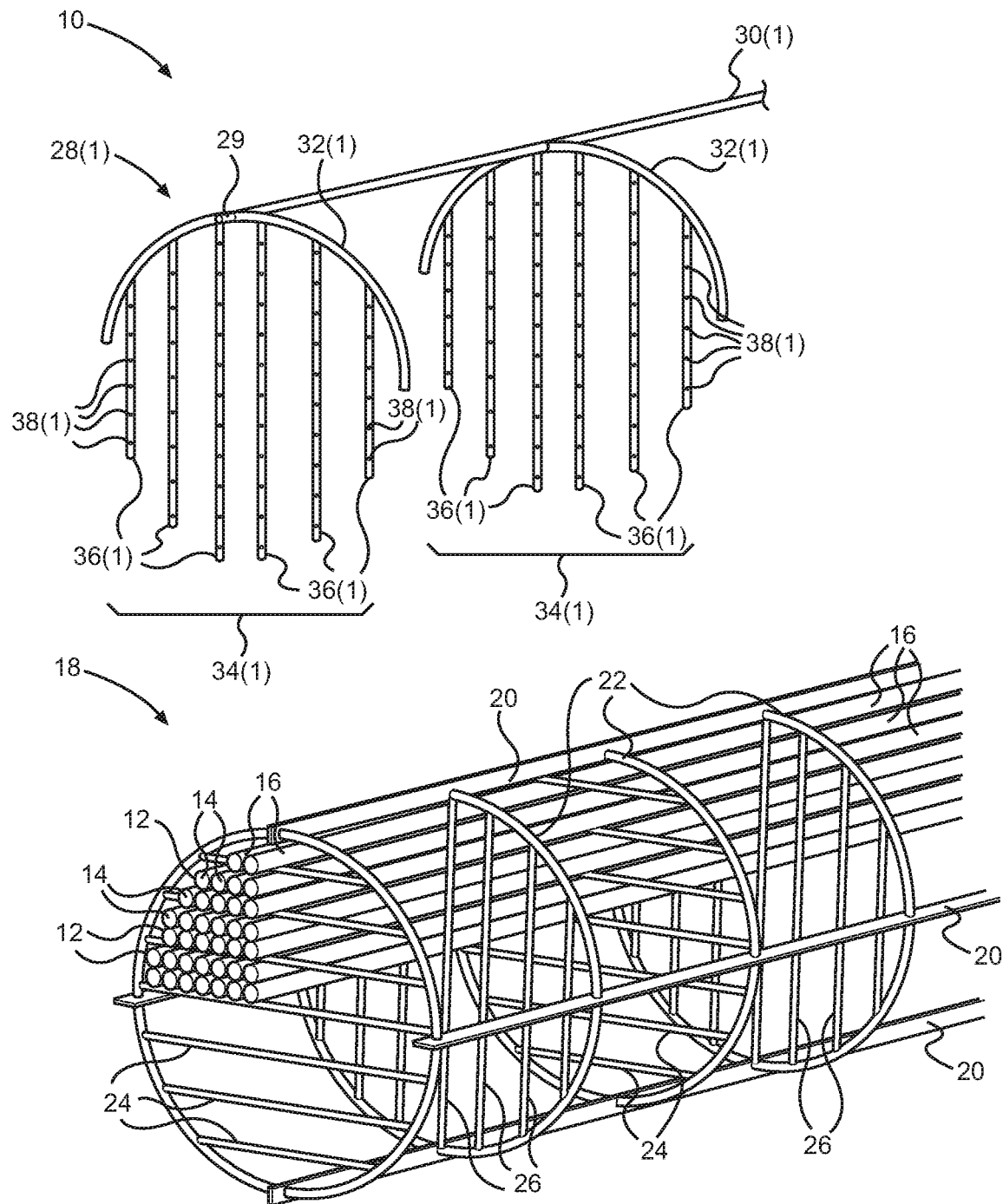
FIG. 1 is a diagram of components of an evaporator comprising an evaporator frame and a first fluid distribution sub-assembly, according to an embodiment.

In this regard, FIG. 1 illustrates components of an evaporator 10 according to an embodiment. In this embodiment, the evaporator 10 comprises an evaporator shell (not shown) having a plurality of thermal elements 12 disposed in an evaporator shell interior. In this embodiment, the thermal elements 12 are pipes configured to carry a thermal fluid 14, but it should be understood that other types of thermal elements 12 may be used. Each thermal element 12 has an external surface 16 in fluidic communication with the evaporator shell interior. The thermal elements 12 are stacked within a rigid cylindrical evaporator frame 18 configured to retain the thermal elements 12 in a predetermined pattern and to provide structural support for the evaporator 10. In the view of FIG. 1, the thermal elements 12 are disposed in an upper left quarter of the evaporator frame 18 to more clearly illustrate the internal elements of the evaporator 10, but it should be understood that, in use, thermal elements 12 would be disposed throughout the entire evaporator frame 18.

In this embodiment, the evaporator frame 18 has a plurality of longitudinal members 20 arranged around a perimeter of the evaporator frame 18 and a plurality of circular members 22 coupled to the longitudinal members 20 at regular intervals along the length of the evaporator 10. A plurality of alternating sets of horizontal support members 24 and vertical support members 26 are coupled within the circular members 22 to retain the thermal elements 12 in place and to enhance the rigidity of the evaporator 10.

In a conventional evaporator (not shown), a working fluid may be sprayed or otherwise distributed at the top of the evaporator frame 18 so that the working fluid cascades down over the thermal elements 12. However, the working fluid begins evaporating as soon as it comes into contact with the uppermost thermal elements 12. Thus, in larger scale applications that contain a large number of thermal elements 12 and/or larger thermal elements 12, the working fluid may be entirely vaporized before it reaches the lowermost thermal elements 12 in the evaporator frame 18. On the other hand, if a larger volume of working fluid is introduced at the top of the evaporator frame 18, the uppermost thermal elements 12 may be effectively inundated by the working fluid, thereby causing the uppermost thermal elements 12 to exhibit inefficiencies normally associated with flooded-type and/or kettle-type evaporators.

To remedy these and other deficiencies, the evaporator 10 in this embodiment includes a fluid distribution sub-assembly 28(1) for distributing a working fluid 29 within the evaporator 10. The fluid distribution sub-assembly 28(1) includes a first primary supply line 30(1) configured to carry a working fluid 29. In this embodiment, a plurality of first manifold tubes 32(1) are spaced apart at regular intervals along the first primarily supply line 30(1), and a plurality of tube sets 34(1) extend from each of the first manifold tubes 32(1). In this manner, each of the individual first tubes 36(1) of the tube sets 34(1) is fluidically coupled to the first primary supply line 30(1) via the manifold tubes 32(1).

Figure 2:
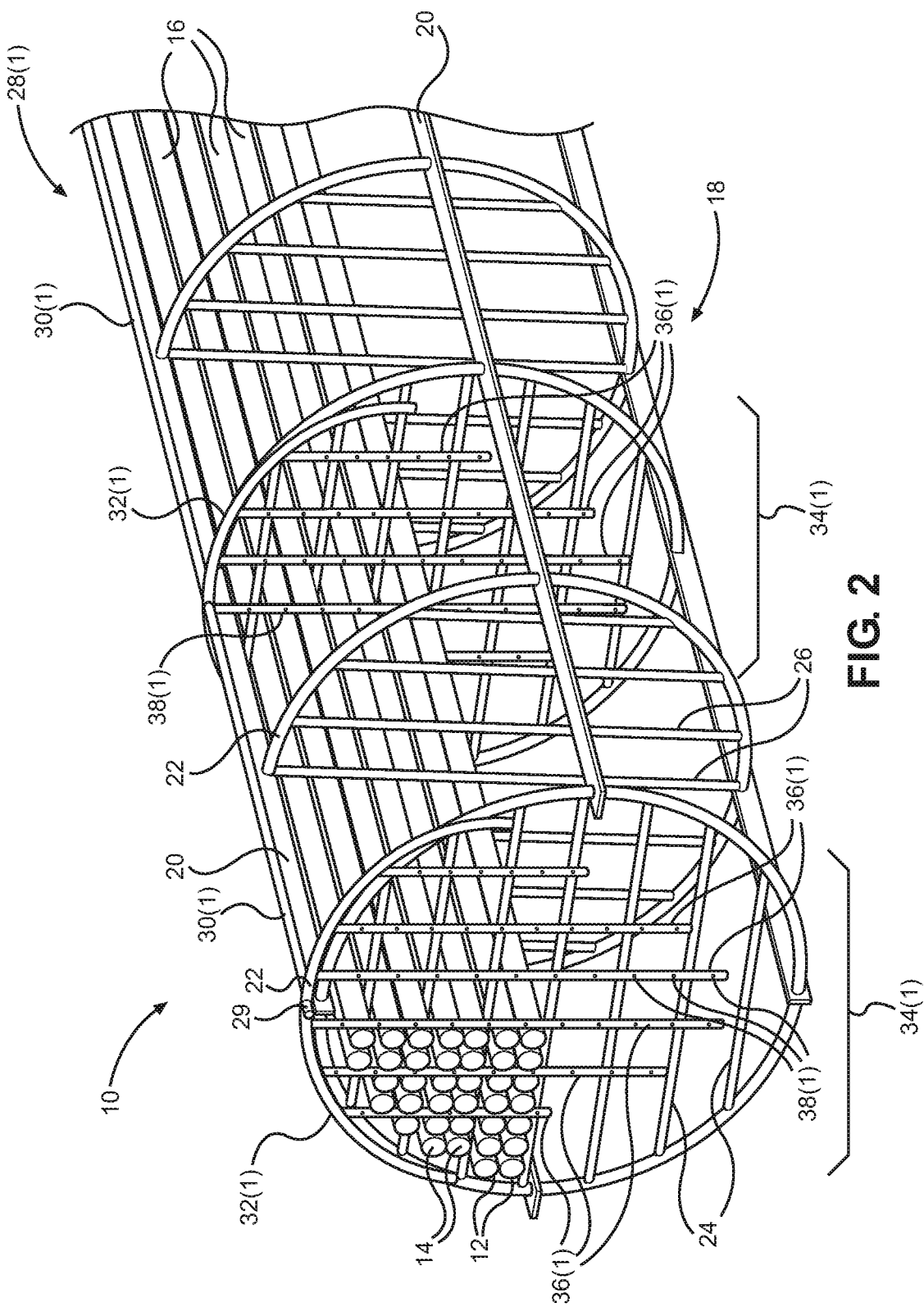
FIG. 2 is a diagram of the components of the evaporator of FIG. 1 in an assembled configuration.

The first fluid distribution sub-assembly 28(1) is assembled together with the evaporator frame 18, with each first tube 36(1) disposed proximate a different subset of thermal elements 12 of the plurality of thermal elements. In this regard, FIG. 2 illustrates the evaporator frame 18 assembled together with the first fluid distribution sub-assembly 28(1). Each first tube 36(1) includes a plurality of first fluid distribution points 38(1), with each first fluid distribution point 38(1) configured to distribute the working fluid 29 proximate the external surface 16 of at least one of the plurality of thermal elements 12.

As discussed above, the first fluid distribution sub-assembly 28(1) causes a greater proportion of the total surface area of the thermal elements 12 to be wetted because the fluid distribution points 38(1) of the first fluid distribution sub-assembly 28(1) are distributed relatively uniformly among the thermal elements 12 in three dimensions. This also allows the bottommost thermal elements 12 to be wetted without inundating the topmost thermal elements, thereby increasing the overall efficiency of the evaporator 10.

In this embodiment, the evaporator 10 of FIGS. 1 and 2 is suitable for use with an Ocean Thermal Energy Conversion (OTEC) application, and will be discussed below in the context of an OTEC application. It should be understood, however, that the embodiments herein are not so limited, and have applicability in many other types of evaporator applications. In an OTEC system, for example, the thermal evaporator 10 used in an OTEC system may use warm seawater as the thermal fluid 14, and the number and size of thermal elements 12 (i.e. warm seawater pipes in this embodiment) can vary based on the requirements of the OTEC system. For example, in a large-scale OTEC system, such as a 100-megawatt OTEC system, the evaporator 10 may comprise, for example, 18,000-20,000 thermal elements 12 having internal pipe diameters between about 13-mm to about 25.4-mm, with the evaporator 10 having a total diameter of about 5 meters. Even in smaller power OTEC systems, the evaporator 10 may comprise, for example, between about 5,000 and about 10,000 thermal elements, with the evaporator 10 having a total diameter between about 3 meters and about 4 meters. In this embodiment, the thermal elements 12 are arranged in a square pitch configuration, but it should be understood that the thermal elements 12 can be arranged in other configurations as desired, such as a triangular or diamond-type pitch configuration for example. The first tubes 36(1) and second tubes 36(2) could also be oriented with respect to each other at non-perpendicular angles. For example, if the thermal elements 12 are oriented in a triangular or diamond-type pitch configuration (not shown), the first tubes 36(1) and second tubes 36(2) may be at a 30 degree or 60 degree angle with respect to each other. Other elements may also be arranged at different angles with respect to each other, including the supply lines 30, horizontal support members 24, vertical support members 26, and/or thermal elements 12, for example.

While only two first tube sets 34(1) are illustrated in FIGS. 1 and 2, the first primary supply line 30(1) may be coupled to any number of first tube sets 34(1). For example, in another embodiment, a third fluid distribution sub-assembly (not shown) could be disposed with a plurality of third tube sets (not shown) at a third angle that is 30 degrees with respect to both the first tubes 36(1) and second tubes 36(2).

The thermal elements 12 may also have different properties for facilitating heat transfer. For example, the thermal elements 12 may be enhanced tubes which have been processed to enhance the surface areas of the thermal elements 12. For example, in some embodiments, the thermal elements 12 may be corrugated, grooved, rolled, machined, knurled, roughened (e.g., sand-blasted), etched (e.g., plasma-etched), sintered, and/or coated with different materials, such as porous materials. In this manner, the external surface 16 of each thermal element 12 may be uniform or non-uniform, as desired. In operation, the evaporator 10 may also be positioned horizontally or vertically, depending on the particular application.

In some embodiments, the first tube sets 34(1) may be spaced from about 0.6 meters to about 1.2 meters apart from one another. In some embodiments, the evaporator 10 may be 8-10 meters in length. In some embodiments, the spacing may be compliant with Tubular Exchanger Manufacturers Association, Inc. (TEMA) standards for baffle spacing. The first fluid distribution sub-assembly 28(1) may comprise any suitable material, including, by way of non-limiting example, metal, plastic, composite, ceramic, stainless steel (SS) or titanium (Ti) metals, thermoplastics, fluoropolymers, and the like.

In this example, the first manifold tubes 32(1) are curved, substantially in an arc that conforms to an outer periphery of the thermal elements 12 illustrated in FIGS. 1 and 2. The first fluid distribution points 38(1) may be, in some embodiments, non-fouling and/or self-cleaning nozzles. It should be understood that any suitable nozzles may be utilized, including metal, plastic, composite and/or ceramic nozzles. In other embodiments, the first fluid distribution points 38(1) may comprise features that are machined into the first tubes 36(1). The first fluid distribution points 38(1) may have well-documented spray patterns to ensure full coverage of the pipes.

Figure 3:
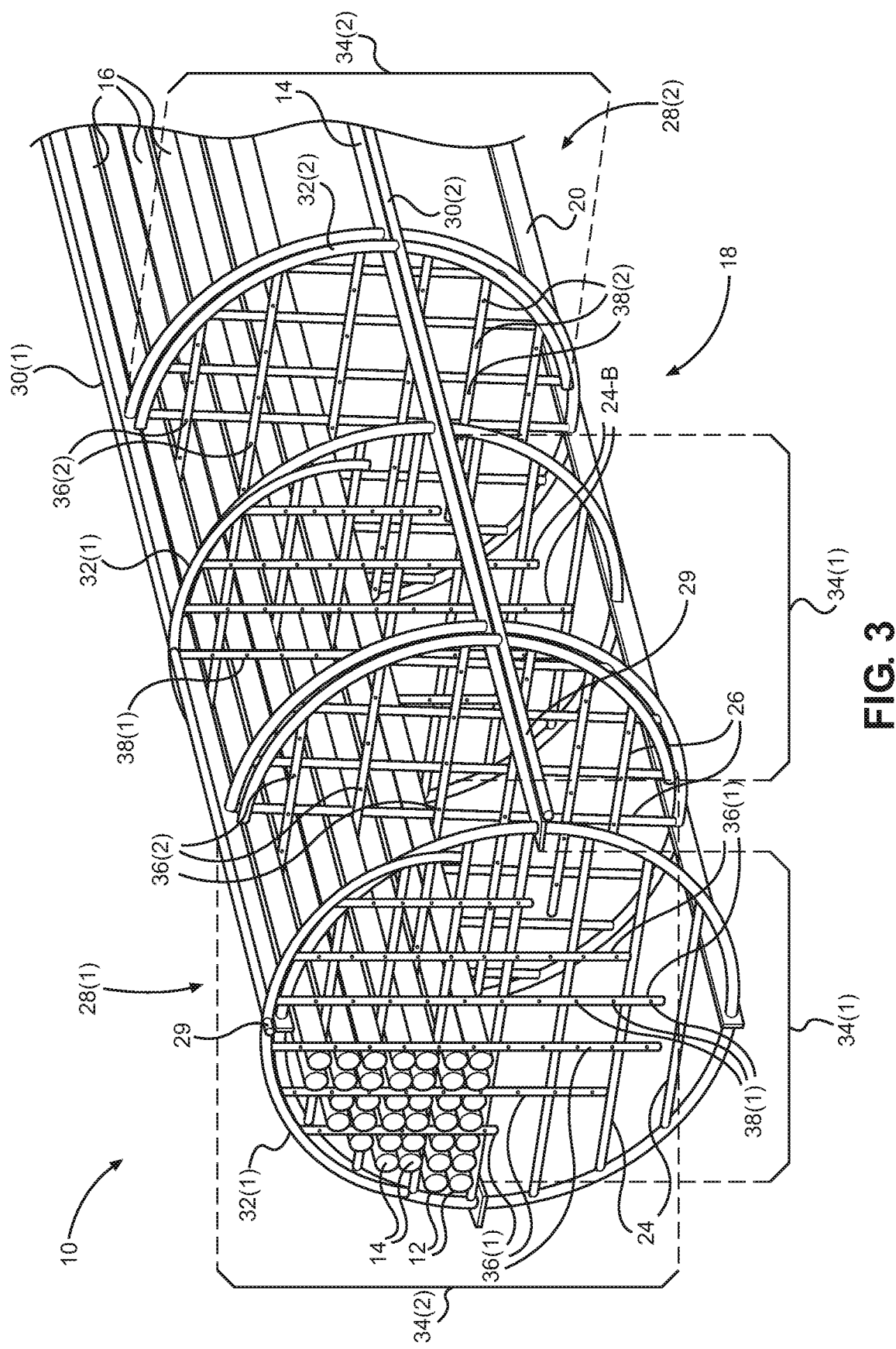
FIG. 3 is a diagram of the components of the evaporator of FIG. 1, further comprising a second fluid distribution sub-assembly in an assembled configuration.

To facilitate more uniform distribution of working fluid 29 within the evaporator 10, multiple fluid distribution sub-assemblies 28 may be employed. In this regard, FIG. 3 illustrates a second fluid distribution sub-assembly 28(2) assembled as part of the evaporator 10 in an orientation transverse to the orientation of the first fluid distribution sub-assembly 28(1). The second fluid distribution sub-assembly 28(2) includes features similar to the first fluid distribution sub-assembly 28(1), including a second primary supply line 30(2) and a plurality of second manifold tubes 32(2) with a plurality of second tube sets 34(2) in fluidic communication with the second primary supply line 30(2).

By orienting the first tubes 36(1) substantially perpendicularly with respect to the second tubes 36(2), fluid distribution points 38(1), 38(2) are positioned in different regular patterns throughout the thermal elements 12, ensuring that working fluid 29 is spread throughout the thermal elements 12 to reach as much of the total surface areas 16 of the thermal elements 12 as possible. In this embodiment, the first tube sets 34(1) are positioned in a staggered arrangement with the second tube sets 34(2), with each first tube set 34(1) positioned along the longitudinal axis of the evaporator 10 a predetermined distance (e.g., one foot or more) from neighboring second tube sets 34(2). In this manner, the first tubes 36(1) and transversely oriented second tubes 36(2) are distributed along the length of the thermal elements 12 in a regular, alternating pattern within the entire length of the evaporator 10.

In this embodiment, the first tubes 36(1) of the first fluid distribution sub-assembly 28(1) have a substantially vertical orientation and the second tubes 36(2) of the second fluid distribution sub-assembly 28(2) have a substantially horizontal orientation, but it should be understood that the first tubes 36 of the fluid distribution sub-assemblies 28 may be arranged in any number of different orientations as desired, based on the pitch configuration or other aspects of the thermal elements 12 for example.

Figure 4A:
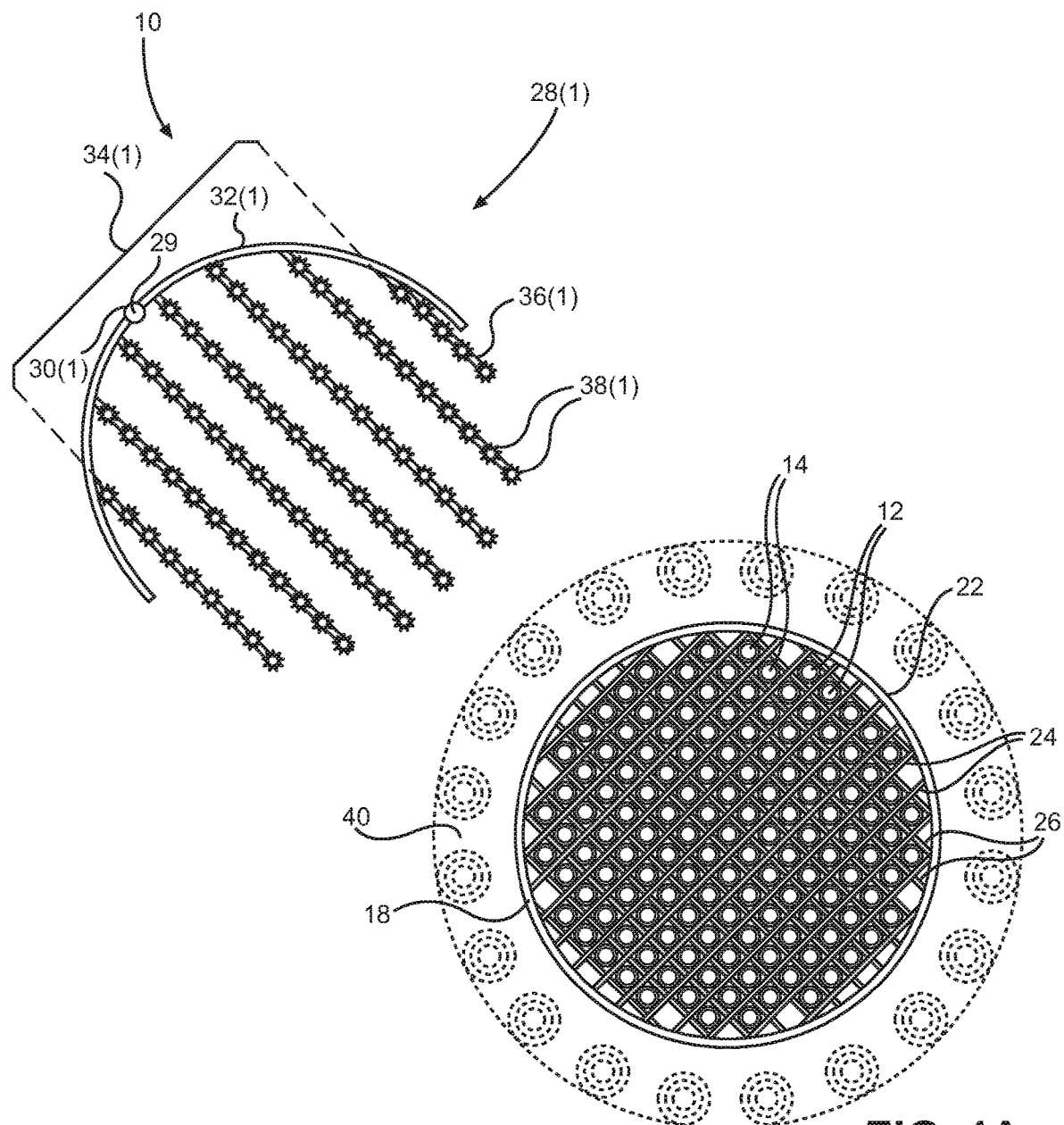
FIG. 4A-4C are cross sectional diagrams of the evaporator of FIGS. 1-3 illustrating assembly and operation of the evaporator, according to an embodiment.
Figure 4B:
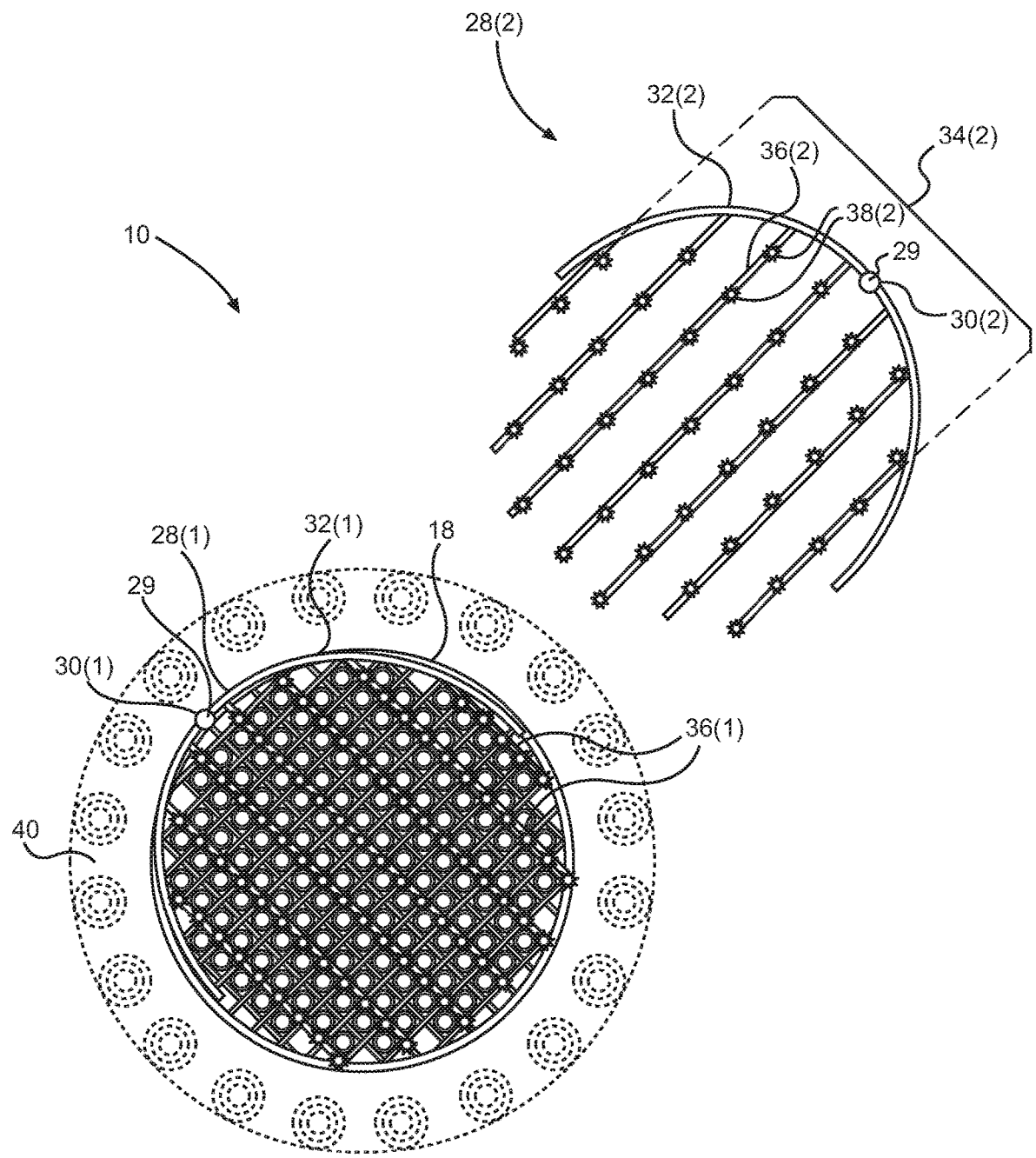
Figure 4C:
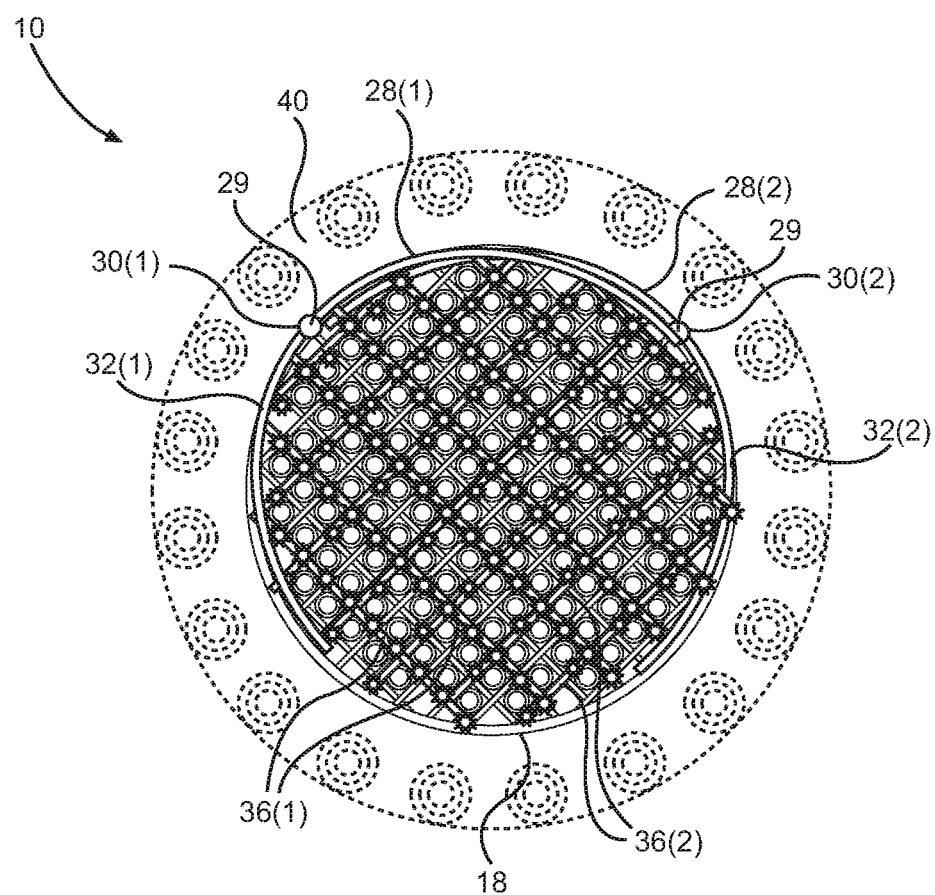

In this regard, FIGS. 4A-4C are cross sectional diagrams of the evaporator 10 of FIGS. 1-3 illustrating assembly and operation of the evaporator 10 with the first fluid distribution sub-assembly 28(1) and second fluid distribution sub-assembly 28(2) oriented substantially 45 degrees with respect to vertical. Referring to FIG. 4A, the evaporator frame 18 is oriented at a 45 degree angle within the evaporator shell 40, such that the square pitch configuration of the thermal elements 12 is also oriented at a 45 degree angle. The first fluid distribution sub-assembly 28(1) is fitted along the evaporator frame 18, such that every thermal element 12 has at least one first tube 36(1) disposed above it, with every thermal element 12 also disposed proximate at least one fluid distribution point 38(1). As shown by FIG. 4B, the second fluid distribution sub-assembly 28(2) is similarly fitted along the evaporator frame 18, such that every thermal element 12 has at least one second tube 36(2) disposed above it, with every thermal element 12 also disposed proximate at least one second fluid distribution point 38(2). FIG. 4C illustrates a cross sectional view of the fully assembled evaporator 10, with the evaporator frame 18, first fluid distribution sub-assembly 28(1) and second fluid distribution sub-assembly 28(2) assembled together within the evaporator shell 40. In this manner all of the thermal elements 12 may be wetted relatively uniformly by both the first fluid distribution sub-assembly 28(1) and the second fluid distribution sub-assembly 28(2) along the entire length of the evaporator 10.

Figure 5:
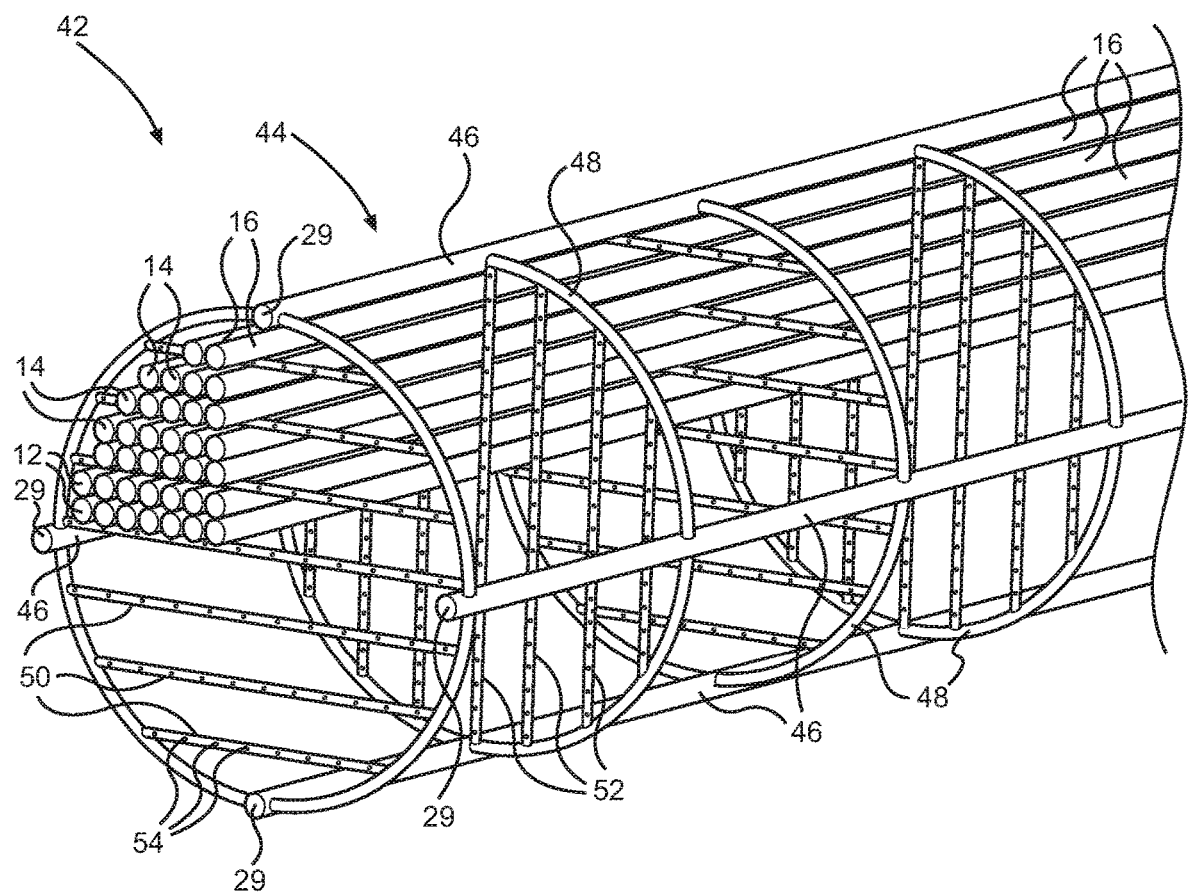
FIG. 5 is a diagram of components of an evaporator comprising an evaporator frame having an integrated fluid distribution sub-assembly, according to an another embodiment.

It is also possible to integrate the functions of the evaporator frame 18 and the fluid distribution sub-assemblies 28 into an integrated structure. In this regard, FIG. 5 illustrates an evaporator 42 having an integrated fluid distribution frame 44 configured to simultaneously provide structural support and rigidity for the thermal elements 12 and the evaporator shell 40 (not shown), as well as facilitating uniform distribution of the working fluid 29 among all of the thermal elements 12 along the entire length of the evaporator 42. In this embodiment, a plurality of primary supply lines 46 are arranged around a plurality of circular manifold tubes 48. Alternating pluralities of first tubes 50 and second tubes 52 are across the circular manifold tubes 48 along the length of the thermal elements 12. In this embodiment, the first tubes 50 are arranged horizontally and the second tubes 52 are arranged vertically, but it should be understood that other configurations may be used as desired. In this embodiment, the alternating pluralities of first tubes 50 and second tubes 52 provide structural support for the thermal elements 12 and provide rigidity to the evaporator 42.

The primary supply lines 46 are also configured to supply the working fluid 29 to the first tubes 50 and second tubes 52 via the circular manifold tubes 48. This allows the working fluid 29 to be uniformly distributed among the thermal elements 12 via a plurality of fluid distribution points 54 in each of the first tubes 50 and second tubes 52 along the length of the evaporator 42.

Figure 6:
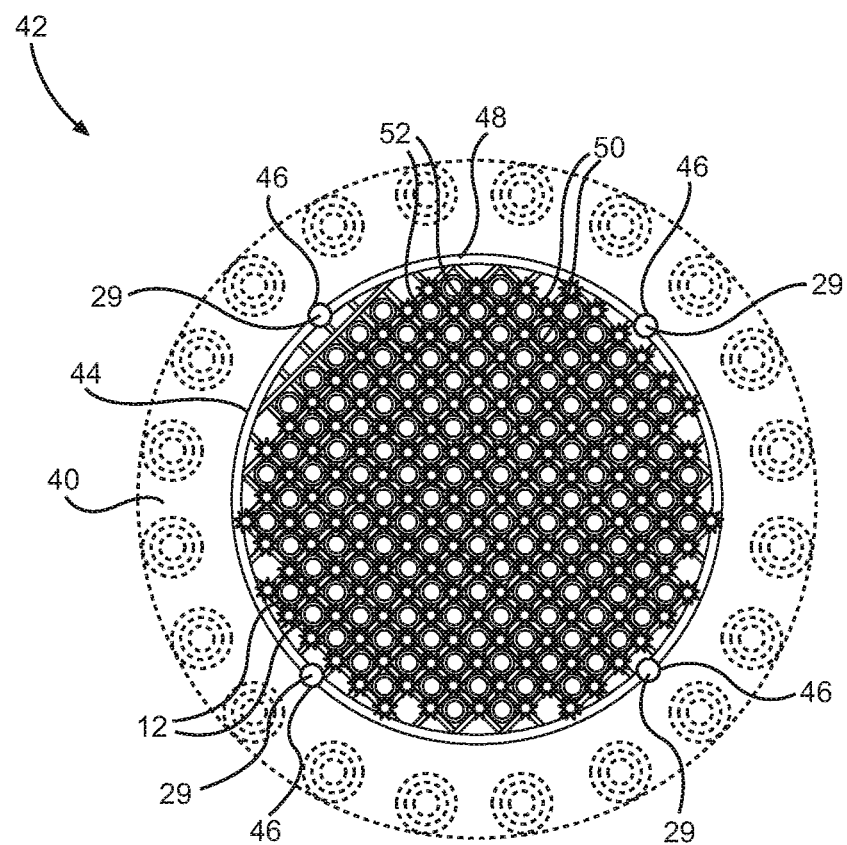
FIG. 6 is a cross-sectional diagram of the evaporator of FIG. 5 illustrating operation of the evaporator according to an embodiment.

FIG. 6 illustrates a cross sectional view of the evaporator 42 of FIG. 5, including the fluid distribution frame 44 disposed within the evaporator shell 40. One advantage of using multiple primary supply lines 46 around the circular manifold tubes 48 in this embodiment is that a pressure differential at different portions of the first tubes 50 and second tubes 52 is reduced. This is because working fluid 29 is being supplied to the first tubes 50 and second tubes 52 from both ends of the first tubes 50 and second tubes 52 at substantially equal pressures, resulting in a smaller pressure differential along the length of each first tube 50 and second tube 52. This reduction in pressure differential allows for the fluid distribution points 54 to provide the working fluid 29 in a narrower range of pressures, thereby providing more uniform amounts of working fluid 29 from each fluid distribution point 54 throughout the evaporator 42.

Figure 7:
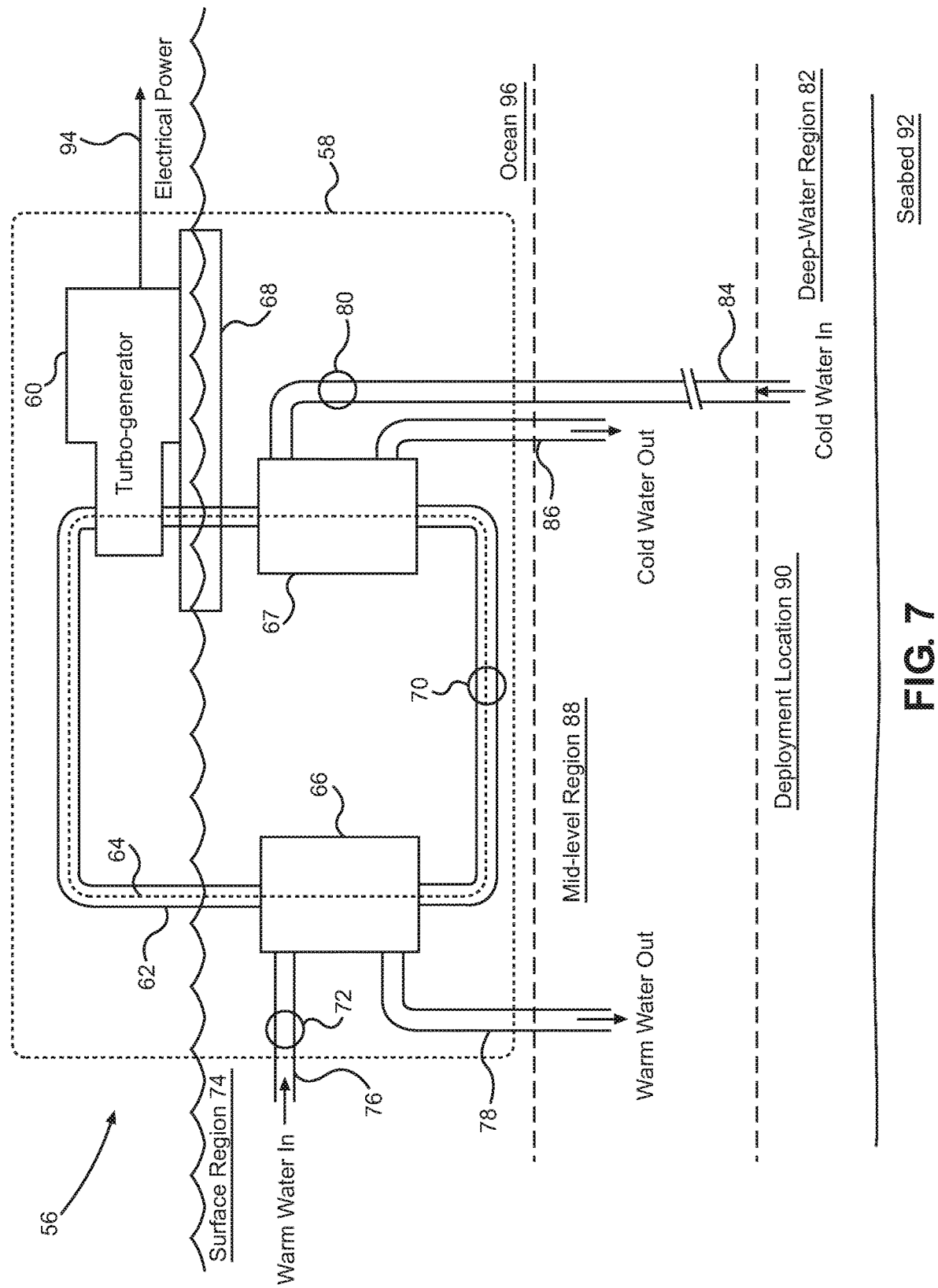
FIG. 7 is a schematic diagram of an OTEC power generation system comprising an evaporator according to an embodiment.

As discussed above, the disclosed embodiments may be suitable for large scale heat exchanger applications, such as OTEC power generation application for example. In this regard, FIG. 7 is a schematic diagram of an OTEC system 56 for power generation in which embodiments may be practiced. The OTEC system 56 in this embodiment comprises an offshore platform 58 having one or more turbogenerators 60 fluidically coupled in a closed-loop conduit 62 carrying a working fluid 64, which may be the same as or similar to the working fluid 29 described above.

The closed-loop conduit 62 also includes an evaporator 66, which may be one of the evaporators 10, 42 disclosed above, and a condenser 67 disposed inline with the turbogenerator(s) 60. In this embodiment the turbogenerators 60 is carried by a buoyant hull 68, and the evaporator 66 and condenser 67 may be disposed below sea level.

In this embodiment, a heat exchanger pump 70 pumps the working fluid 64 into the evaporator 66 during operation of the OTEC system 56. A warm seawater pump 72 pumps warm seawater from a warm surface region 74 of the ocean via a warm seawater inlet 76 disposed in the warm surface region 74. In a typical OTEC deployment, the water in surface region 74 is at a substantially constant temperature of approximately 25 degrees centigrade (subject to weather and sunlight conditions). The warm seawater heats the working fluid 64 in the evaporator 66 sufficient to vaporize the working fluid 64, as discussed above with respect to evaporators 10, 42, for example.

The spent warm seawater, which is now slightly cooler, is then ejected from the evaporator 66 via a warm seawater outlet 78. The vaporized working fluid 64 causes a pressure differential in the closed-loop conduit 62 on opposite sides of the turbogenerator 60, thereby forcing the vaporized working fluid 64 though the turbogenerator 60 and causing the turbogenerator 60 to generate electrical energy in response to a flow of working fluid 64 though the turbogenerator 60.

After exiting the turbogenerator 60, the vaporized working fluid 64 enters the condenser 67. A cold seawater pump 80 pumps cold seawater from a cold deep-water region 82 of the ocean via a cold seawater inlet 84 disposed in the cold deep-water region 82. Typically, the cold deep-water region 82 is approximately 1,000 meters below the surface of the ocean, at which depth water is at a substantially constant temperature of a few degrees centigrade. The cold seawater cools the working fluid 64 in the condenser 67 to condense the working fluid 64 into a liquid phase. The vaporized working fluid 64 is pumped back into the evaporator 66 by the heat exchanger pump 70 and the cycle continues indefinitely.

Meanwhile, the spent cold seawater, which is now slightly warmer, is ejected from the condenser 67 via a cold seawater outlet 86. In this embodiment, the spent warm seawater and the spent cold seawater are both ejected into a mid-level region 88 of the ocean, away from both the warm surface region 74 and the cold deep-water region 82, but the spent seawater can be ejected in a different location, provided the spent seawater is not ejected proximate to the warm seawater inlet 76 or the cold seawater inlet 84, where it could lower the average temperature of the incoming warm water or raise the average temperature of the incoming cold seawater, thereby reducing the efficiency of the evaporator 66 and/or condenser 67.

In this embodiment, the offshore platform 58 is a tension leg offshore platform, and the buoyant hull 68 includes a deck, caissons, and pontoons (not shown). The buoyant hull 68 is anchored at a deployment location 90 above a seabed 92 by rigid tension legs (not shown).

In some embodiments, the offshore platform 58 may be deployed at another deployment location 90 in a body of water other than an ocean (e.g., a lake, sea, etc.). In some embodiments, the offshore platform 58 may be another type of offshore platform, such as a semi-submersible platform, spar platform, drillship platform, jack up offshore platform, grazing plant, or the like.

In this embodiment, the turbogenerator 60 is a turbine-driven generator. As discussed above, the turbogenerator 60 generates electrical energy in response to a flow of fluid and provides the generated electrical energy on one or more output cable 94 in this embodiment. In this manner, the turbogenerator 60 is part of a Rankine-cycle engine that generates electrical energy based on the difference in the temperature of water in surface region 74 and the temperature of water in deep-water region 82.

As discussed above, the evaporator 66 may be a shell and tube heat exchanger, such as evaporators 10, 42 discussed above, for example, and the condenser 67 may also be a shell and tube heat exchanger having similar features.

Ammonia is often used as working fluid 64 in OTEC systems 56; however, it will be clear to one skilled in the art that any fluid that evaporates at the temperature of the water in surface region 74 and condenses at the temperature of the water in deep-water region 82 is suitable for use as working fluid 64 (subject to material compatibility constraints).

Figure 8:
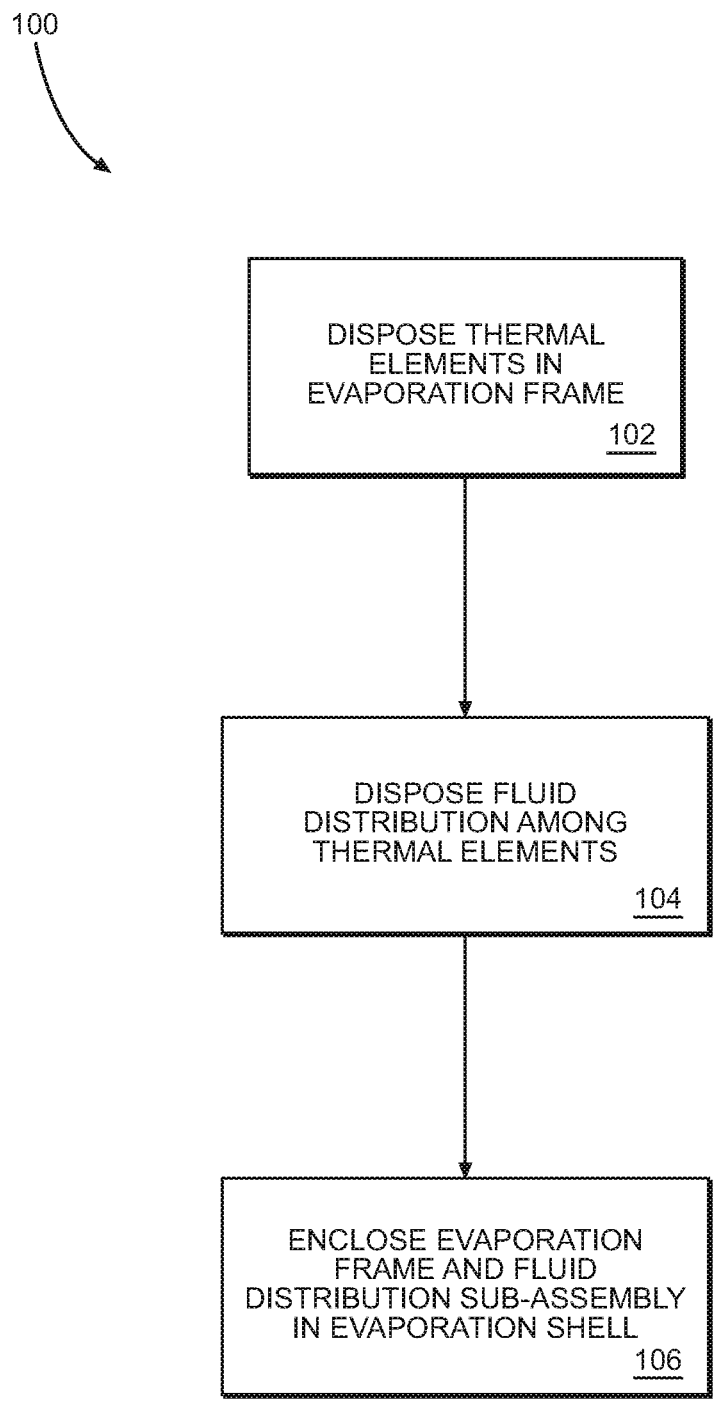
FIG. 8 is a flowchart illustrating a method of assembling an evaporator comprising an evaporator frame and a fluid distribution sub-assembly, according to an embodiment.

Referring now to FIG. 8, a method 100 of assembling the evaporator 10 of FIGS. 1-3 is disclosed. In this embodiment, the method 100 comprises disposing a plurality of thermal elements, e.g. thermal elements 12, in an evaporator frame (Block 102). The method 100 further comprises disposing a plurality of fluid distribution tubes, e.g., tubes 36, of a fluid distribution sub-assembly among the thermal elements, each tube proximate a different subset of thermal elements of the plurality of thermal elements (Block 104). The method 100 further comprises enclosing the evaporator frame and the fluid distribution sub-assembly in an evaporator shell, e.g., evaporator shell 40.

Among other advantages, the embodiments facilitate a low-cost, large-scale, high-efficiency evaporator. The embodiments result in even flow distribution and use of the entire evaporator core volume for spray evaporation.

Those skilled in the art will recognize improvements and modifications to the preferred embodiments of the disclosure. All such improvements and modifications are considered within the scope of the concepts disclosed herein and the claims that follow.

What is claimed is:

1. An evaporator comprising:
   an evaporator shell forming a shell interior;
   a plurality of thermal elements configured to carry a thermal fluid disposed in the shell interior, each thermal element comprising an external surface in fluidic communication with the shell interior;
   a first primary supply line disposed in the interior, the first primary supply line configured to carry a working fluid; and
   a plurality of first tube sets fluidically coupled to the first primary supply line, each first tube set spaced apart from an adjacent first tube set along the first primary supply line,
   at least one first tube set comprising a plurality of first tubes, at least two of the first tubes extending between and beyond at least two pairs of the plurality of thermal elements, each first tube of the at least two first tubes comprising a plurality of first fluid distribution points that are spaced apart from one another along a length of the first tube and that are configured to distribute the working fluid proximate the external surfaces of the at least two pairs of the plurality of thermal elements.

2. The evaporator of claim 1, wherein the first primary supply line extends in a first direction, the plurality of thermal elements extend in the first direction, and the plurality of first tubes of the plurality of first tube sets extend in a second direction perpendicular to the first direction.

3. The evaporator of claim 1, further comprising a second primary supply line disposed in the interior, the second primary supply line configured to carry the working fluid;
   a plurality of second tube sets fluidically coupled to the second primary supply line, each second tube set spaced apart from an adjacent second tube set along the first primary supply line,
   each second tube set comprising a plurality of second tubes, at least two of the second tubes each being adjacent to external surfaces of at least two thermal elements of the plurality of thermal elements, each second tube comprising a plurality of second fluid distribution points that are configured to distribute the working fluid into the shell interior.

4. The evaporator of claim 3, wherein the first primary supply line extends in a first direction, the second primary supply line extends in the first direction, the plurality of thermal elements extend in the first direction, the plurality of first tubes of the plurality of first tube sets extend in a second direction perpendicular to the first direction, and the plurality of second tubes of the plurality of second tube sets extend in a third direction perpendicular to the first direction, the third direction different from the second direction.

5. The evaporator of claim 4, wherein the second direction is perpendicular to the third direction.

6. The evaporator of claim 1, wherein the thermal fluid is seawater.

7. The evaporator of claim 6, wherein the working fluid is ammonia.

8. The evaporator of claim 7, wherein, for each thermal element, the external surface of the thermal element is non-uniform.

9. The evaporator of claim 1, wherein the plurality of thermal elements is arranged in a square pitch configuration.

10. The evaporator of claim 1, wherein the plurality of thermal elements is arranged in a triangular pitch configuration.

11. The evaporator of claim 1, wherein the plurality of thermal elements comprises between about 2,500 thermal elements and about 20,000 thermal elements, and wherein the evaporator shell has a diameter between about 2 meters and about 5 meters.

12. The evaporator of claim 11, wherein the first tubes have an interior diameter between about 6 mm and about 10 mm.

13. The evaporator of claim 1, further comprising a plurality of first manifold tubes, each first manifold tube of the plurality of first manifold tubes fluidically coupled to the first primary supply line and fluidically coupled to the plurality of first tubes of a respective first tube set.

14. The evaporator of claim 13, wherein each manifold tube is disposed about an outer periphery of the plurality of thermal elements.

15. The evaporator of claim 1 further comprising a first manifold tube, the first manifold tube being fluidically coupled to the first primary supply line and fluidically coupled to the at least one first tube set, wherein the first manifold tube has a circular shape, and wherein each of the at least two of the first tubes have a length at least as long as a radius of the circular shape.

16. The evaporator of claim 1 wherein the plurality of first tubes of one first tube set of the at least one first tube set are in a first plane and are parallel to one another, and further comprising a second tube set comprising a plurality of second tubes, the plurality of second tubes being in a second plane, being parallel to one another, and extending perpendicular to the one first tube set, at least two of the second tubes each extending between and beyond at least two pairs of the plurality of thermal elements, each second tube of the at least two second tubes comprising a plurality of second fluid distribution points that are spaced apart from one another along a length of the second tube and that are configured to distribute the working fluid proximate the external surfaces of the at least two pairs of the plurality of thermal elements.

17. A fluid distribution assembly comprising:
a first primary supply line configured to carry a working fluid; and
a plurality of first tube sets fluidically coupled to the first primary supply line, the plurality of first tube sets configured to be disposed among a plurality of thermal elements that carry a thermal fluid, each first tube set spaced a first distance from an adjacent first tube set along the first primary supply line,
at least one first tube set comprising a plurality of first tubes, at least two of the first tubes extending between and beyond at least two pairs of the plurality of thermal elements, each first tube of the at least two first tubes comprising a plurality of first fluid distribution points that are spaced apart from one another along a length of the first tube and that are configured to distribute the working fluid proximate the external surfaces of the at least two pairs of the plurality of thermal elements.

18. A heat exchanger system comprising:
an evaporator comprising:
an evaporator shell forming a shell interior;
a plurality of thermal elements configured to carry a thermal fluid disposed in the shell interior, each thermal element comprising an external surface in fluidic communication with the shell interior;
a first primary supply line disposed in the interior, the first primary supply line configured to carry a working fluid; and
a plurality of first tube sets fluidically coupled to the first primary supply line, each first tube set spaced apart from an adjacent first tube set along the first primary supply line,
at least one first tube set comprising a plurality of first tubes, at least two of the first tubes each extending between and beyond at least two pairs of the plurality of thermal elements, each first tube of the at least two first tubes comprising a plurality of first fluid distribution points that are spaced apart from one another along a length of the first tube and that are configured to distribute the working fluid proximate the external surfaces of the at least two pairs of the plurality of thermal elements, the thermal elements configured to vaporize the working fluid;
a turbogenerator comprising a working fluid inlet and a working fluid outlet and a turbine, the working fluid inlet fluidically coupled to the shell interior and configured to receive the vaporized working fluid, the turbine fluidically coupled between the working fluid inlet and the working fluid outlet and configured to generate electrical energy in response to the vaporized working fluid passing through the turbine; and
a condenser fluidically coupled between the working fluid outlet and the first primary supply line, the condenser configured to condense the working fluid and supply the condensed working fluid to the first primary supply line.

19. The heat exchanger system of claim 18, wherein the heat exchanger system is an Ocean Thermal Energy Conversion (OTEC) system.

20. a method of assembling an evaporator comprising:
disposing a plurality of thermal elements in an evaporator frame, each thermal element configured to carry a thermal fluid;
disposing a plurality of fluid distribution tubes of a fluid distribution sub-assembly among the thermal elements, the fluid distribution sub-assembly comprising a first primary supply line confiqured to carry a workinq fluid and beinq fluidically coupled to the plurality of fluid distribution tubes, at least two of the fluid distribution tubes extending between and beyond at least two pairs of the plurality of thermal elements, each fluid distribution tube of the at least two fluid distribution tubes comprising a plurality of first fluid distribution points that are spaced apart from one another along a length of the fluid distribution tube and that are configured to distribute the working fluid proximate external surfaces of the at least two pairs of the plurality of thermal elements; and
enclosing the evaporator frame and the fluid distribution sub-assembly in an evaporator shell.

21. The method of claim 20, further comprising disposing the evaporator in an Ocean Thermal Energy Conversion (OTEC) system.

\* \* \* \* \*